(12) United States Patent
Wheelock (10) Patent No.: US 6,197,265 B1
(45) Date of Patent: Mar. 6, 2001

(54) GAS DISTRIBUTION SYSTEM FOR A TWO-ZONE FLUIDIZED BED REACTOR

(75) Inventor: Thomas D. Wheelock, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/233,897

(22) Filed: Jan. 20, 1999

Related U.S. Application Data (60) Provisional application No. 60/072,031, filed on Jan. 21, 1998.

(51) Int. Cl.[7] .............................. F27B 15/10; F27B 15/02

(52) U.S. Cl. ......................... 422/143; 422/311; 422/140

(58) Field of Search .................................... 422/143, 139, 422/311, 140, 141, 142; 34/585, 582, 583, 584; 110/245; 432/58; 137/884, 120; 239/121, 270, 271, 549, 556, 563

(56) References Cited

U.S. PATENT DOCUMENTS

| | | | |
|---|---|---|---|
| 3,215,508 | * 11/1965 | Piester . | |
| 3,914,089 | * 10/1975 | Desty et al. . | |
| 4,102,989 | 7/1978 | Wheelock | 423/541 |
| 4,159,305 | * 6/1979 | Moorey | 422/143 |
| 4,171,945 | * 10/1979 | Lazenby | 431/170 |
| 4,226,830 | * 10/1980 | Davis | 422/143 |
| 5,433,939 | 7/1995 | Wheelock | 423/638 |
| 5,568,776 | * 10/1996 | Suraniti et al. | 110/245 |
| 5,653,955 | 8/1997 | Wheelock | 423/638 |
| 5,861,130 | * 1/1999 | Werhahn et al. | 422/143 |

FOREIGN PATENT DOCUMENTS

| | | |
|---|---|---|
| 618307 | 7/1989 | (AU) . |

OTHER PUBLICATIONS

S.B. Jagtap & T.D. Wheelock, Regeneration of Sulfided Calcium–Based Sorbents by a Cyclic Process, *Energy & Fuels*, 1996, 10, 821–827.

T.D. Wheelock and C.E. Morris, Recovery of Sulfur Dioxide and Lime from Waste Gypsum, *Fachberichte*, 1986, 110, 37–46.

T.D. Wheelock, Recovery of Sulfur and Lime from FGD Residues, presented at the conference on Management of High Sulfur Coal Combustion Residues: Issues and Practices, Springfield, IL, Apr. 5–7, 1994.

L.L. Smith, M.L. Fortney, C.E. Morris and T.D. Wheelock, Resource Recovery from Wastewater Treatment Sludge Containing Gypsum, presented at Eleventh National Waste Processing Conference and Exhibit, Orlando, FL, Jun. 3–6, 1984.

T.D. Wheelock and K.R. Floy, Decomposition of Gypsum in a Two–Stage Fluidized Bed Reactor, Proceedings of the Third International Symposium on Phosphogypsum, Florida Institute of Phosphate Research, Bartow, FL, 1990, vol. I, pp. 280–297.

(List continued on next page.)

*Primary Examiner*—Shrive Beck
*Assistant Examiner*—Susan Ohorodnik
(74) *Attorney, Agent, or Firm*—Zarley, McKee, Thomte, Voorhees & Sease (57) ABSTRACT

The present invention provides an improved method for constructing a gas distribution system which creates two distinct reaction zones within the same fluidized bed. The invention provides for the distribution of one type of gas at the bottom of the fluidized bed and a second type of gas at a higher level in the fluidized bed. The system is constructed of a plurality of modular units constructed entirely of refractory materials. The modules are fitted and linked together to form a grid, the size of which can be varied to accommodate different reactor sizes.

20 Claims, 8 Drawing Sheets

OTHER PUBLICATIONS

T.D. Wheelock and C.–W Fan, "Disposal of RAAP Wastewater Treatment Sludges by Incineration", Phase IV Final Report, Chem. Eng. Dept. and Eng. Res. inst., Iowa State Univ., Ames, IA, Jul. 31, 1985. (only 12 of 67 pages included).

T.D. Wheelock and T. Riel, Cyclic Operation of a Fluidized Bed Reactor for Decomposing Calcium Sulfate, *Chem. Eng. Comm.*, 109, 155–166 (1991).

C.E. Morris, T.D. Wheelock, and L.L. Smith, AIChE Symposium Series, No. 255, vol. 83, 1987, pp. 94–104.

\* cited by examiner

GAS DISTRIBUTION SYSTEM FOR A TWO-ZONE FLUIDIZED BED REACTOR

CROSS-REFERENCE TO A RELATED APPLICATION

This application claims the benefit of U.S. Provisional Application No. 60/072,031 filed Jan. 21, 1998.

BACKGROUND OF THE INVENTION

1. Field of the Invention

The present invention relates to gas fluidized bed reactors. More particularly, though not exclusively, the present invention relates to an apparatus and method for the improved construction of a gas distribution system for a fluidized bed reactor having two reaction zones.

2. Problems in the Art

Several processes have been proposed in the prior art for treating solid particles in a two-zone fluidized bed reactor. For some applications of a two-zone fluidized bed reactor, oxidizing conditions are maintained in one zone while reducing conditions are maintained in another zone so that as the particles circulate in the fluidized bed, they are alternately oxidized and reduced.

One example where such a reactor can be used is for the conversion of calcium sulfide to calcium oxide at a temperature in the range of 900° C. to 1200° C. This example is explained in detail in U.S. Pat. Nos. 5,433,939 and 5,653,955 which are incorporated by reference herein. When calcium sulfide particles are treated with air in this temperature range, an outer layer of each calcium sulfide particle is converted to calcium sulfate which prevents further reaction. However, if the particles are treated subsequently with a reducing gas, the layer of calcium sulfate formed on the surface is converted to calcium oxide, which is porous enough to allow oxygen to penetrate and to react with another layer of calcium sulfide. As the particles are exposed repeatedly to oxidizing and reducing conditions, they are converted one small layer at a time, first to calcium sulfate and then to calcium oxide until all of the calcium sulfide is gone.

Another process where a two-zone fluidized bed reactor can be used is for the conversion of calcium sulfate particles to calcium oxide particles in the 1000° C. to 1200° C. temperature range. This example is explained in detail in U.S. Pat. No. 4,102,989 which is incorporated by reference herein. While reducing conditions are needed to convert calcium sulfate into calcium oxide in this temperature range, and the rate of conversion is proportional to the reducing gas concentration, such conditions also favor side reactions which convert calcium sulfate into calcium sulfide. By using the two-zone fluidized bed reactor in which the circulating particles are alternately and repeatedly exposed to reduction and oxidation, any calcium sulfide produced during a pass through the reducing zone is eliminated during a subsequent pass through the oxidizing zone. After numerous passes through the oxidizing and reducing zones, the particles are converted almost entirely into calcium oxide.

The process of alternately oxidizing and reducing particles has been demonstrated in the prior art in bench-scale two-zone fluidized bed reactors up to ten inches in diameter. This is explained in detail in C. E. Morris, T. D. Wheelock, and L. L. Smith, "Processing Waste Gypsum in a Two-Zone Fluidized Bed Reactor", AIChE Symposium Series No. 255, (Vol. 83), pp. 94–104 (1987), which is incorporated by reference herein. In these prior art reactors, a mixture of primary air and natural gas has been introduced through a refractory grid plate at the bottom of the fluidized bed and excess secondary air has been introduced through an axial ceramic tube which discharged air from above at approximately mid-level in the fluidized bed. By employing a sub-stoichiometric amount of primary air, highly reducing conditions have been created in approximately the lower half of the fluidized bed, and by introducing excess secondary air at mid-level, oxidizing conditions have been created in approximately the upper half of the fluidized bed. Since sulfur dioxide has been released within the fluidized bed, the gas phase has been extremely corrosive for metals at the high reaction temperature. Therefore, the internal components of reactors have been made entirely of refractory materials.

It is very difficult to apply the concept of two-zone fluidized bed reactors on a large commercial scale since the reactor has to be constructed almost entirely of refractory materials in order to withstand the high temperature and corrosive conditions. The design and fabrication of large refractory grid plates for gas distribution and for the support of high temperature fluidized beds is well known in the art. However, existing designs do not provide for the distribution of a second gas higher in the fluidized bed. Therefore, a practical and effective system is needed for distributing different gases at two or more different levels within the same fluidized bed for large scale reactors.

Features of the Invention

A general feature of the present invention is the provision of a method and apparatus for providing a two-zone fluidized bed reactor which overcomes problems found in the prior art.

A further feature of the present invention is the provision of a method and apparatus for providing a two-zone fluidized bed reactor gas distributor comprised of a plurality of grid modules placed together to form the gas distributor.

Further features, objects and advantages of the present invention include:

A method and apparatus for providing a two-zone fluidized bed reactor gas distributor which utilizes a plurality of grid modules which include both upper and lower discharge openings.

A method and apparatus for providing a two-zone fluidized bed reactor gas distributor which utilizes a plurality of grid modules which are adapted to interlock with each other.

A method and apparatus for providing a two-zone fluidized bed reactor gas distributor which utilizes a plurality of grid modules having passageways formed therein for distributing gas to the fluidized bed.

A method and apparatus for providing a two-zone fluidized bed reactor gas distributor which utilizes a plurality of grid modules, each including a central vertical tube extending upward for introducing a gas into the fluidized bed.

A method and apparatus for providing a two-zone fluidized bed reactor gas distributor which utilizes a plurality of grid modules including downwardly sloping openings for introducing gas into the fluidized bed while preventing particles from entering the openings.

A method and apparatus for providing a two-zone fluidized bed reactor gas distributor using a plurality of square grid modules interlocked together.

A method and apparatus for providing a two-zone fluidized bed reactor gas distributor using a plurality of triangular grid modules interlocked together.

These as well as other features, objects and advantages of the present invention will become apparent from the following specification and claims.

SUMMARY OF THE INVENTION

The two-zone fluidized bed reactor gas distributor of the present invention is comprised of a supporting structure and one or more modules supported by the supporting structure. Each of the modules includes a body portion and first and second passageways for gas. One of the passageways extends upward from the body in order to create the upper level of the two-zone fluidized bed. The second passageway supplies gas to the fluidized bed at a level lower than the first passageway.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalencies which may be included within the spirit and scope of the invention.

The present invention (described in detail below) provides a method and apparatus for the construction of a gas distribution system for a two-zone fluidized bed reactor. This system provides for the distribution of one type of gas at the bottom of the bed and another type of gas at a higher level in the bed. The gas distribution system is constructed entirely of refractory materials, either ceramic or cermet. The system is also constructed in modular form. Ceramic modules are fitted and linked together as described in detail below, to form a gas distribution grid, the size of which can be varied to accommodate various reactor sizes by using different numbers of modules.

Figures 1, 2, 3A, 3B:
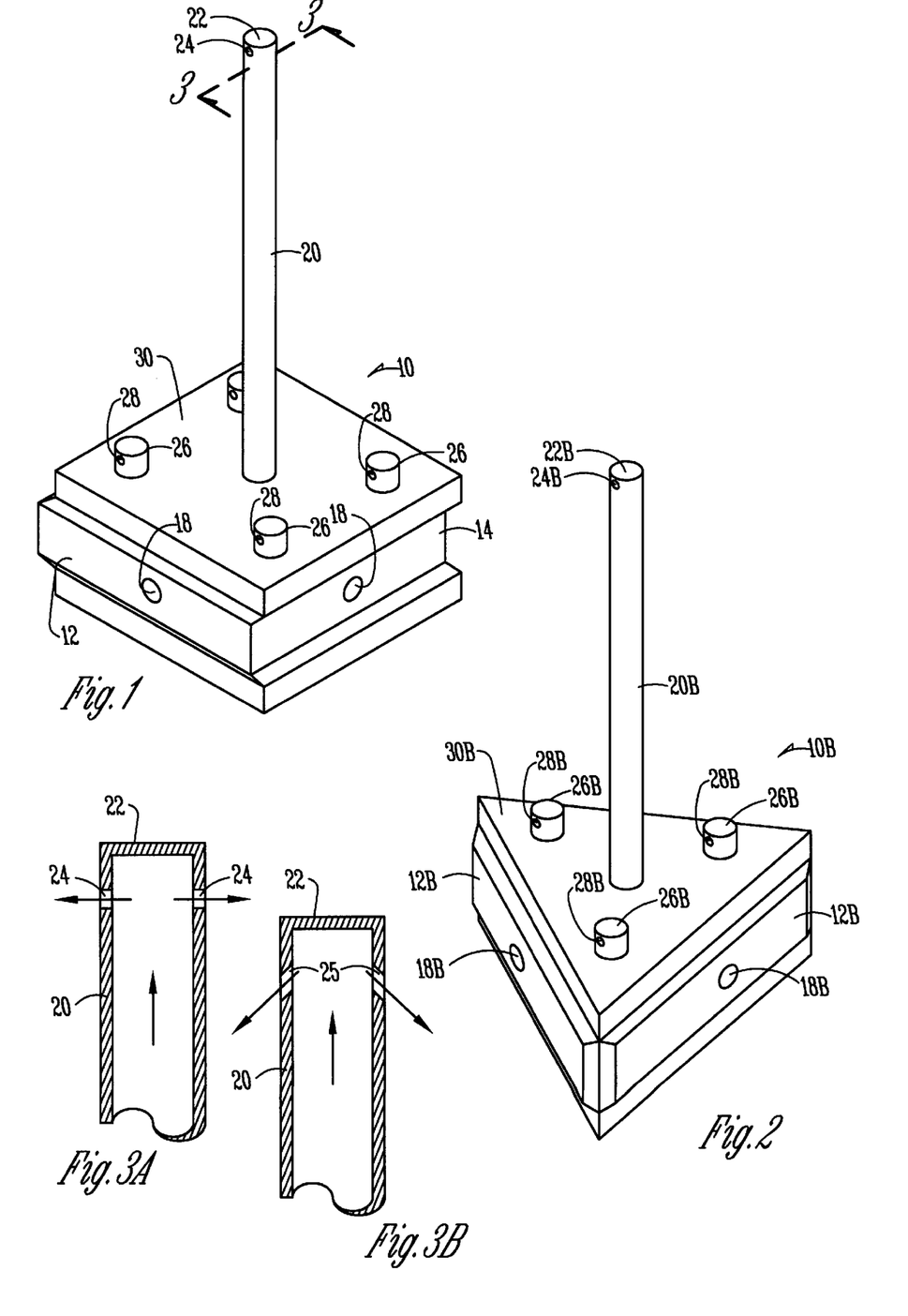
FIG. 1 is a perspective view of a grid module of the present invention.
FIG. 2 is a perspective view of an alternate grid module of the present invention.
FIGS. 3A and 3B are alternate partial enlarged sectional views taken along line 3—3 of FIG. 1.

FIG. 1 is a perspective view of an individual square grid module 10. The module 10 is designed to be placed on a perforated flat supporting structure (described below) and to be fitted between four similar surrounding grid modules 10 or a perimeter module (described below). In the preferred embodiment, the modules 10 fit together in a "tongue and groove" manner. Two adjacent sides of each module 10 protrude outward a short distance (forming a tongue 12) to fit into a recessed side (groove 14) of an adjacent module 10. The other two sides of the module 10 are recessed (forming the groove 14) to receive the protruding sides or tongues 12 of the adjacent modules 10. Each module 10 is provided with four vertical passageways 16 (described below) for conducting gas from below the grid plate to the bottom of the fluidized bed.

Each module 10 also includes horizontal passageways 18 for conducting a second gas to a vertical tube 20 which rises from the center of the module 10. The horizontal passageways 18 intersect with similar passageways from adjacent modules and serve to conduct the second gas from one module 10 to the next. The upper end 22 of the central vertical tube 20 is closed in the preferred embodiment to prevent the back flow of particles into the tube 20. Several small holes 24 provided in the side of the tube 20 near the upper end 22 for passing gas into the fluidized bed. In the preferred embodiment, each of the four vertical passageways 16 in the module 10 is fitted with a cap 26 to prevent the back flow of particles into the passageway 16. Each cap 26 has several horizontal holes 28 for admitting gas to the bottom of the fluidized bed. The caps extend upward from the module 10 approximately 1 inch in the example shown.

The entire module 10 is made from refractory materials. The main body 30 is made from a castable refractory material such as a high-alumina content castable. The central vertical tube 20 and caps 26 are made either of ceramic or cermet materials. Suitable ceramics include mullite and silicon carbide.

The preferred overall dimensions of the main body 30 are 9 in. long, 9 in. wide, and 6 in. thick. A module 10 of this size will deliver gas to approximately 81 square inches of fluidized bed cross section. In reactors designed to operate with a fluidized bed depth of 3 to 4 feet, the central vertical tube 20 preferably extends upwards a distance of 18 to 24 inches above the main body 30 of the module 10.

FIG. 2 shows an alternate module 10B of the present invention. FIG. 2 shows a triangular grid module 10B which, as shown, has a triangular cross section when viewed from above, as opposed to the square cross section of the module 10 shown in FIG. 1. Each module 10B is provided with three vertical passageways, caps 26b, and a central vertical tube 20b, similar to the analogous components shown in FIG. 1. Like the module 10, the module 10B includes a system of horizontal passageways 18B which are in communication with the vertical tube 20B. While the design of the triangular grid module 10B is similar in many respects to the design of the square grid module 10, the design of the preferred triangular module 10B differs in that all three sides of the triangular module 10B are either recessed (forming grooves) or protrude (forming tongues 12B) in order to fit several modules 10B together. In this embodiment, two types of triangular modules 10B are required for the construction of a gas distributor. The first type of module 10B has three recessed, or grooved sides while the second type of module 10B has tongues 12B formed on each side. Of course other embodiments can be used, for example modules with two tongues and one groove, or with two grooves and one tongue.

In a plan view, a triangular grid module 10B will have the shape of an equilateral triangle. To provide the same surface area as a 9 in.×9 in. square module, the triangular module 10B will have sides which are approximately 13.7 in. long.

FIG. 3 shows a partial enlarged sectional view of the upper end 22 of the vertical tube 20 shown in FIG. 1. As shown, the vertical tube 20 includes two holes 24 formed to allow gas to flow out of the tube 20 as illustrated by the arrows. FIG. 3B shows an alternate embodiment of the present invention. As shown, the vertical tube 20 of FIG. 3B is identical to the vertical tube 20 of FIG. 3a except that the holes 25 in FIG. 3B are angled downward. The holes 25 further restrict the settling of particles in the vertical tube 20 when the gas flow is turned off. The details shown in FIGS. 3a and 3B apply to the structure of the vertical tubes 20 and 20B as well as the caps 26 and 26B shown in FIGS. 1 and 2. Alternatively, the vertical tube 20 could have more than two holes 24 or 25, or the vertical tube could be open ended.

Figure 4:
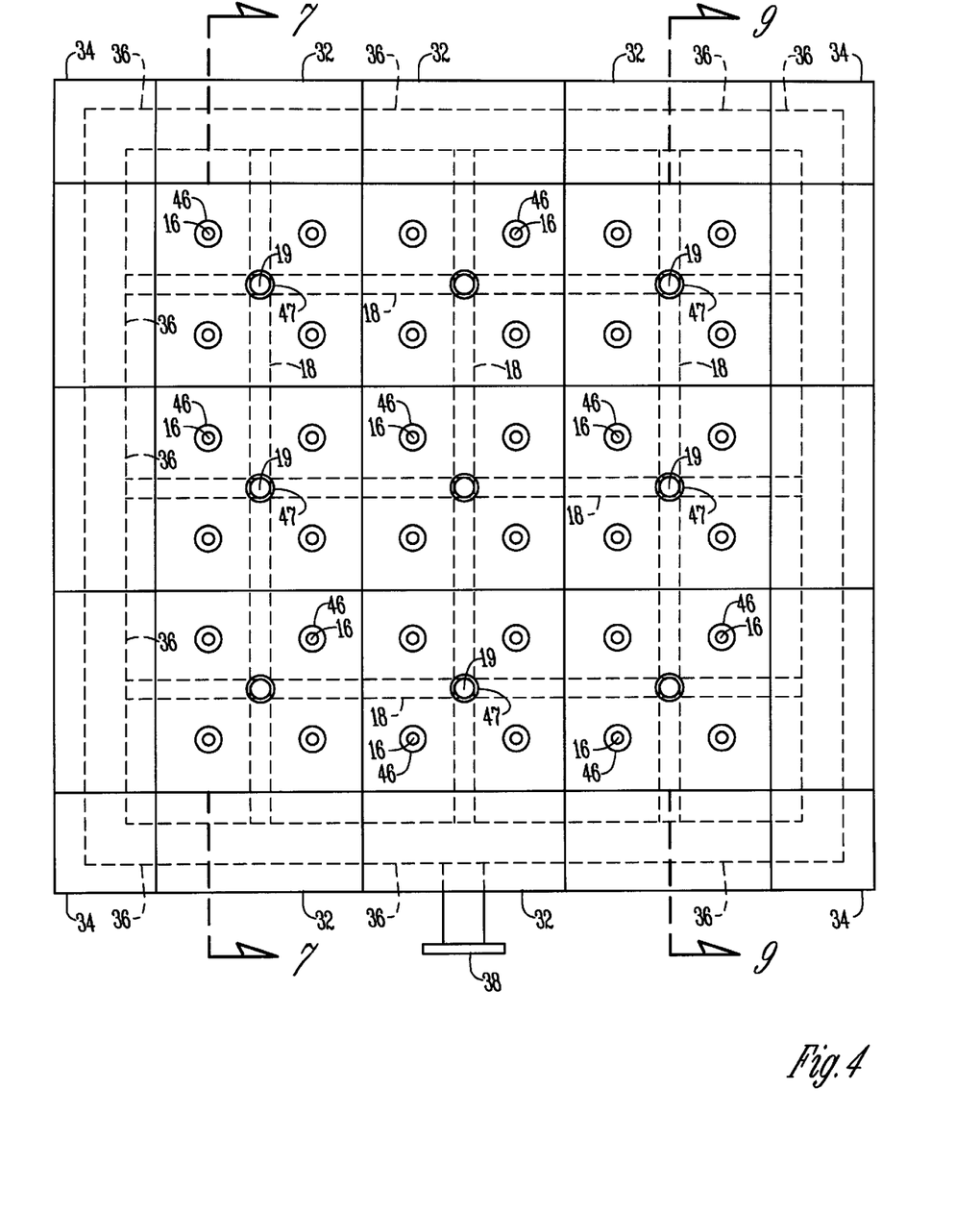
FIG. 4 is a plan view of an assembly of the grid modules shown in FIG. 1.
Figure 5:
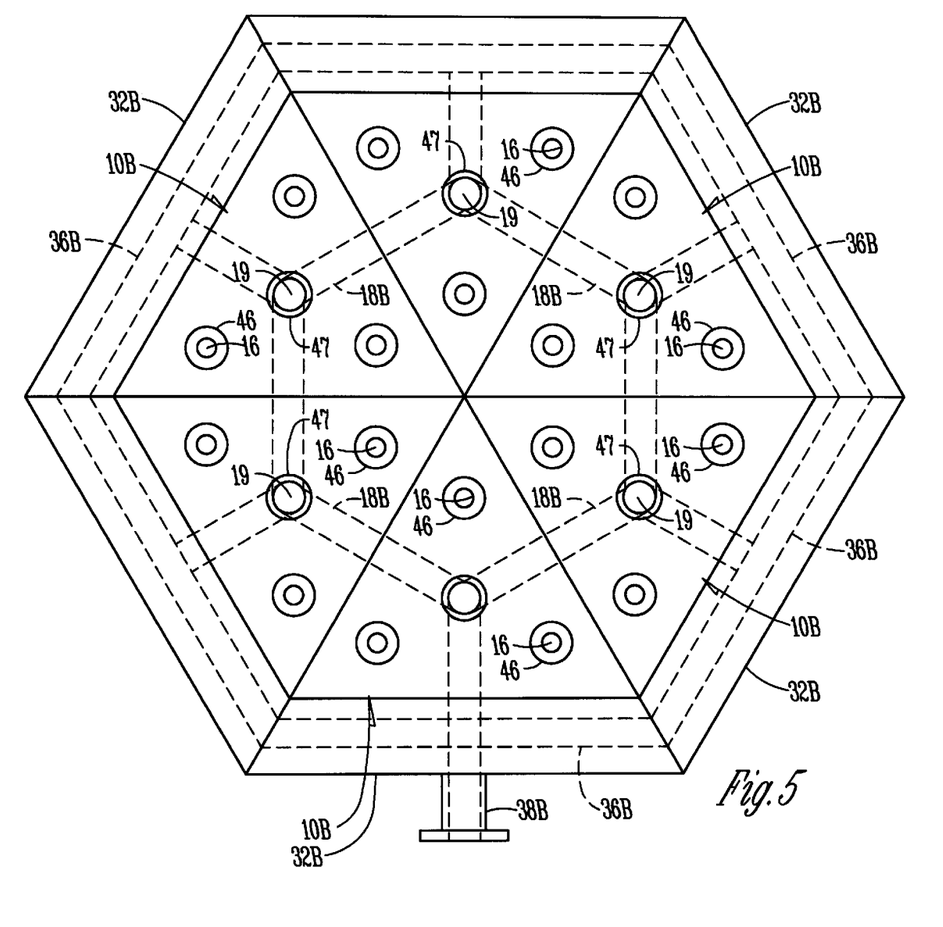
FIG. 5 is a plan view of an assembly of the grid modules shown in FIG. 2.

To construct a gas distributor of the present invention, a number of modules 10 or 10B are fitted together as shown in FIGS. 4 and 5. FIGS. 4 and 5 are shown with the tubes 20 and caps 26 removed. FIG. 4 is a plan view of a complete assembly of nine grid modules 10. In addition to the modules 10 shown in FIG. 1, a complete assembly also includes perimeter modules 32 as well as corner modules 34. The perimeter modules 32 and corner modules 34 form a passageway 36 extending around the entire periphery of the assembly. The twelve perimeter modules 32 and four corner modules 34 form a manifold surrounding the square grid modules 10. A gas inlet 38 is formed in one of the modules 32 and is in communication with the passageway 36 and a source of gas. As can be seen, gas distributors ranging in size from one module to a large number of modules can be constructed using the same basic modules shown. The modules 10, 32 and 34 are normally bonded together with refractory cement which also serves to seal the joints between modules and therefore to prevent gas leakage through the joints between the modules.

FIG. 5 is a plan view of a complete assembly of six triangular grid modules 10B and six perimeter modules 32B. The gas distributor shown in FIG. 5 could be used with a cylindrical fluidized bed. In this case, a hexagonal grid plate is constructed using the triangular shaped modules 10B. As discussed above, alternate modules 10B have protruding and recessive sides, respectively. The design can be expanded to accommodate larger diameter reactors by adding more of the basic modules. In this way, fluidized beds of various sizes can be created.

Figure 6:
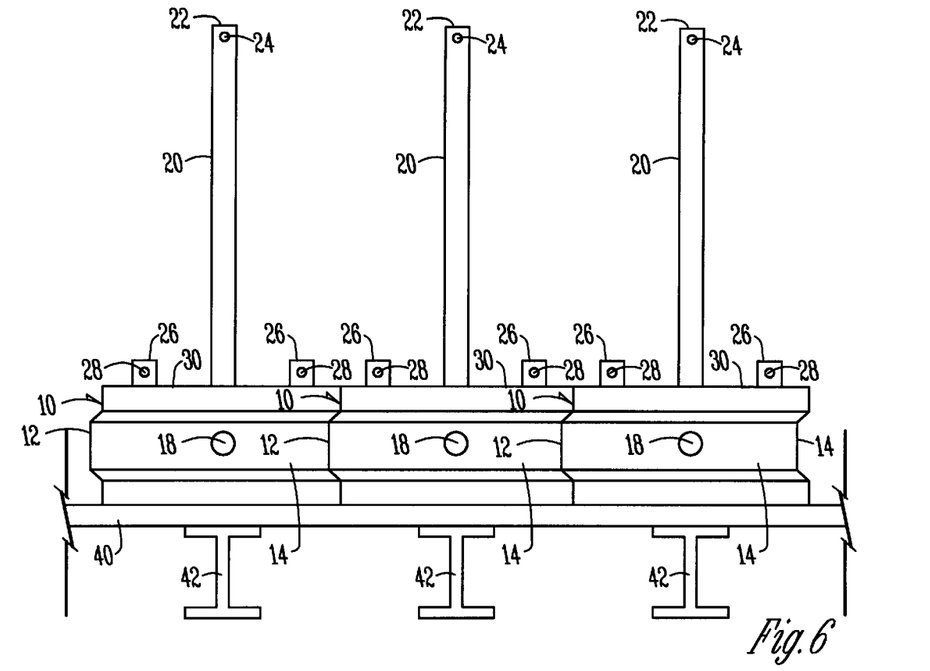
FIG. 6 is an elevational view of the fluidized bed gas distributor of the present invention.

FIGS. 6 through 9 show various views of three square grid modules 10 interlocked together to form a fluidized bed gas distributor. Note that only three square grid modules 10 are shown for purposes of clarity. Again, a fluidized bed could contain as few as one module 10 or a large number of modules 10. As shown in FIG. 6, the modules 10 are supported on a metal deck comprised of a perforated flat grid plate 40 placed on a plurality of I-beams 42. Of course, for smaller fluidized beds, the I-beams 42 may not be required. In addition, the modules 10 could be supported by various other structures. In most applications, the metal supporting structure comprised of the plate 40 and I-beams 42 would be exposed to the less corrosive of the two types of gases supplied to the fluidized bed. In addition, the metal supporting structure would not be exposed to the severely corrosive conditions which would be present above the gas distributor, or above the modules 10.

Figure 7:
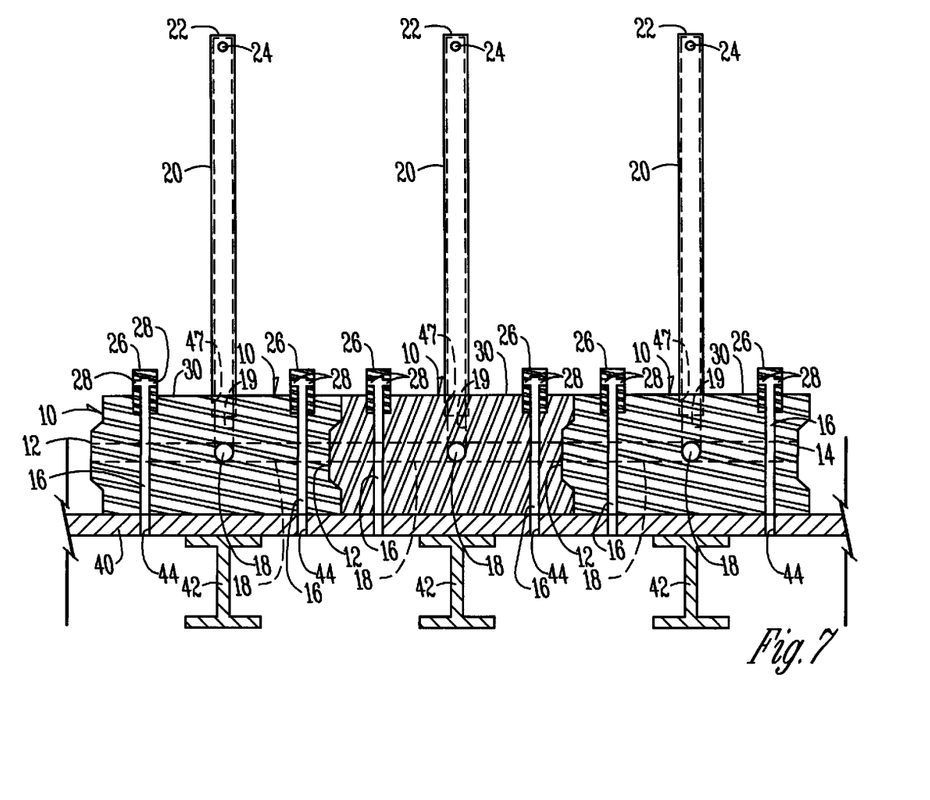
FIG. 7 is a sectional view of the fluidized bed gas distributor of the present invention taken along line 7—7 of FIG. 4.

FIG. 7 is a partial sectional view taken along line 7—7 of FIG. 4, but excluding the perimeter modules 32. The cross section is taken through the vertical passageways 16 which conduct gas through the grid to the bottom of the fluidized bed. As discussed above, the vertical passageways 16 are fitted with ceramic caps 26 to prevent the back flow of solids which could occur when the upward flow of the gas is interrupted or stopped. Preferably, the caps 26 are held in place using refractory cement. Holes 28 formed in the caps 26 allow the gas to flow from the vertical passageways 16 to the fluidized bed. Note that for purposes of clarity, the caps 26 shown in FIG. 7 are rotated 90° compared to the caps 26 shown in FIG. 6. A number of holes 44 are formed in the metal grid plate which match the vertical passageways 16 in the ceramic modules 10. The holes 44 allow gas to flow from below the grid plate 40 through the passageways 16 and out through the holes 28 in the caps 26.

Figure 8:
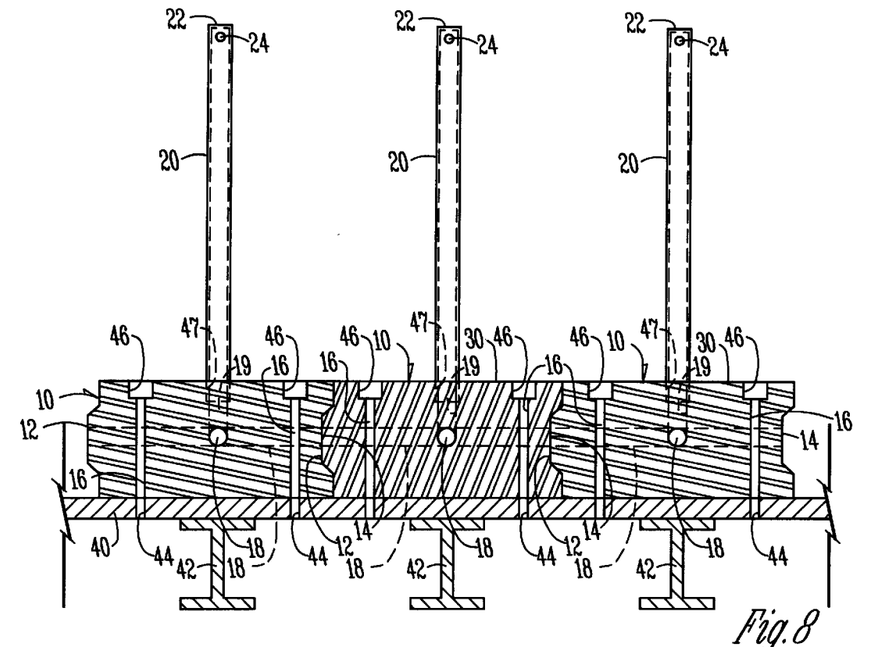
FIG. 8 shows the fluidized bed gas distributor shown in FIG. 7 with the ceramic caps removed.

FIG. 8 is a view similar to FIG. 7 except that the caps 26 are removed. For some applications, it is advantageous to dispense with the ceramic caps 26. As shown in FIG. 8, a recess 46 is formed in the module 10 for receiving the cap 26. The recess 46 also functions as an enlarged vertical passage which reduces the velocity of the gas as it enters the fluidized bed. By reducing the velocity of the gas as it enters the bed, the bed turbulence at the point of gas introduction is reduced which in turn reduces particle attrition. This can be advantageous if the particles are fragile and attrition generates excessive amounts of fines which are elutriated from the fluidized bed, possibly without reacting completely.

Figure 9:
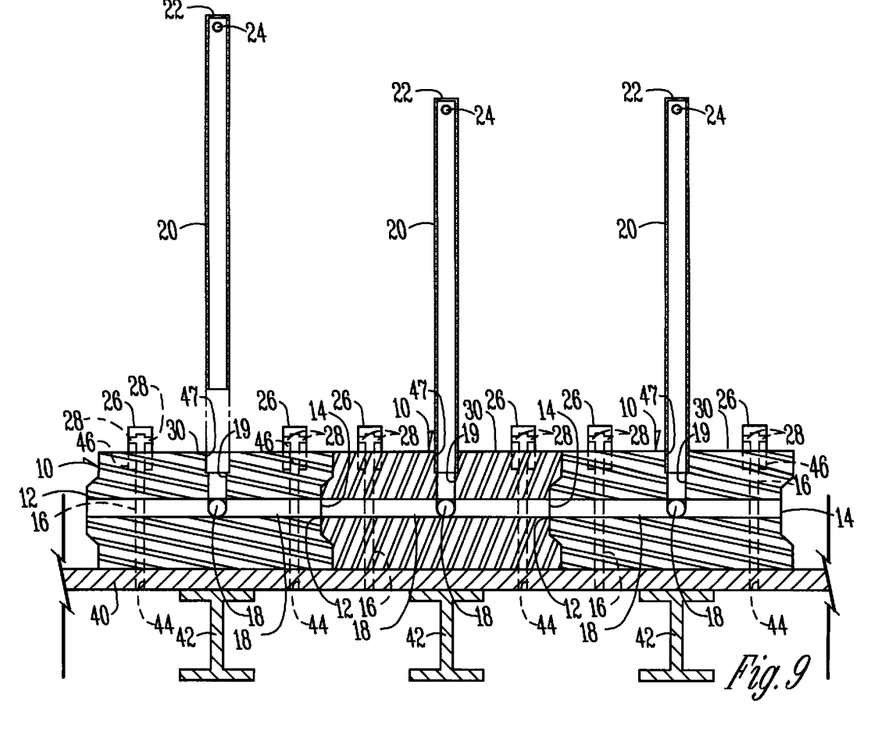
FIG. 9 is a sectional view of the fluidized bed gas distributor of the present invention taken along line 9—9 of FIG. 4.

FIG. 9 is a sectional view taken along line 9—9 of FIG. 4, except shown without the perimeter modules 32 for purposes of clarity. The section is taken along the horizontal passageways 18 which supply gas to the vertical tubes 20 which in turn distribute gas to the upper fluidized bed level. Passageways 18 also distribute gas from one module 10 to the next while supplying the vertical tubes 20 with gas. The module 10 on the left in FIG. 9 is shown with the vertical tube 20 removed. The main body 30 includes a recess 47 to receive the central vertical tube 20 which is secured with refractory cement.

Figure 10:
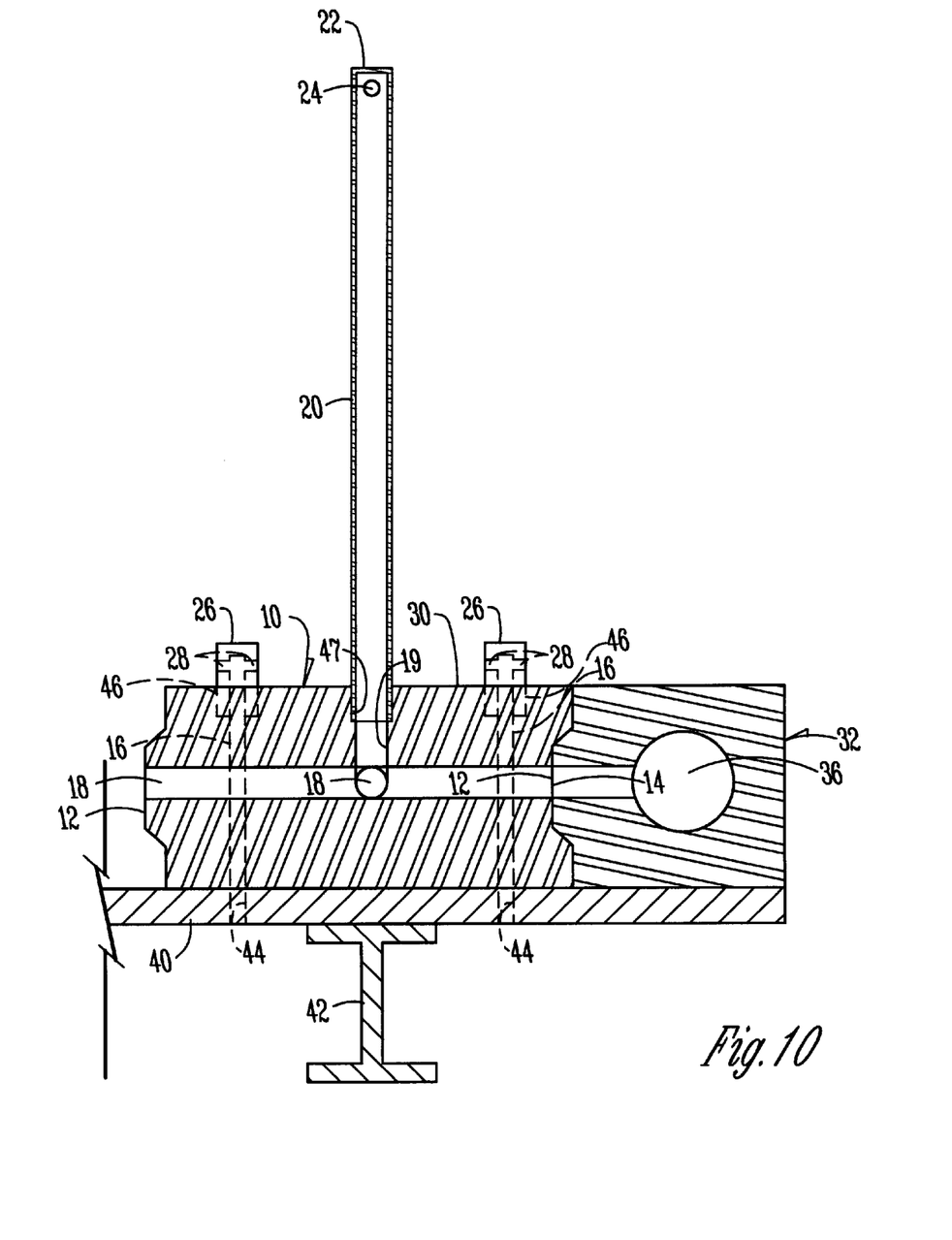
FIG. 10 is a partial sectional view showing a grid module and a perimeter module of the present invention.

The entire assembly of grid modules 10 which make up a complete gas distributor is surrounded by a manifold which is constructed of ceramic perimeter modules 32 and corner modules 34 as described above. A vertical cross section of one module 10 and perimeter module 32 is shown in FIG. 10. The inboard side of each perimeter module 32 is designed to match the side of an adjacent grid module 10 such that the passageway 18 is in communication with the passageway 36. Therefore, the inboard side of each perimeter module 32 either protrudes or recesses (tongue or groove) to match the side of the adjacent grid module 10. In the example shown in FIG. 10, groove 14 of the module 10 matches the tongue 12 of the perimeter module 32.

Figure 11:
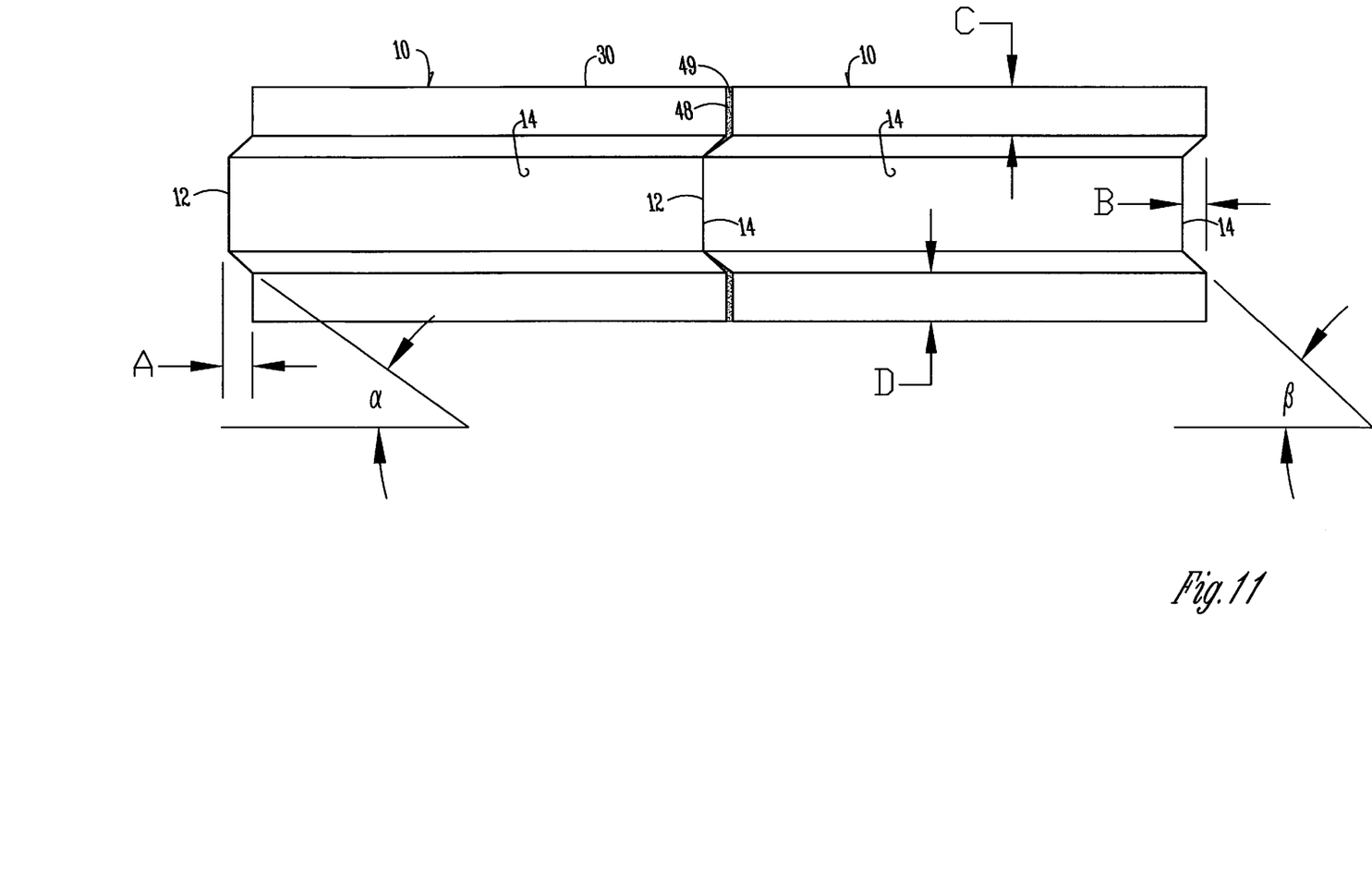
FIG. 11 is an elevational view of two interlocked grid modules illustrating various dimensions.

FIG. 11 shows two interlocked modules 10 of the preferred embodiment. As shown, the tongue 12 of the right module is interlocked with the groove 14 of the left module. As shown, the dimensions and angles of the tongue and groove are designed to provide a gap 48 between the left and right portions of the modules 10. The gap 48 is created by making the angle α smaller than angle β. The gap 48 will be created at the top and bottom of the joint between the two adjacent modules 10 when they are fitted together. The gap 48 is filled with refractory cement 49 (shown by the shading) to seal the joint and prevent gas leakage around the joint. Typical dimensions for a 6 inch thick module 10 are as follows:

α=45°
β=66°
A=0.9 in.

B=0.9 in.
C=1.2 in.
D=1.2 in.

where A is the length of the tongue 12, B is the depth of the groove 14, and C and D are the distances outside the tongue and groove. By employing these preferred dimensions, a 0.5 in. wide gap will be created at the top and bottom of the joint between adjacent modules 10 for filling with refractory cement. It should also be noted that the Figures are not drawn to scale. For example, the diameter of the tube 20 would actually be smaller than the passageways 18 in order to keep the pressure up to a desired level.

Figure 12:
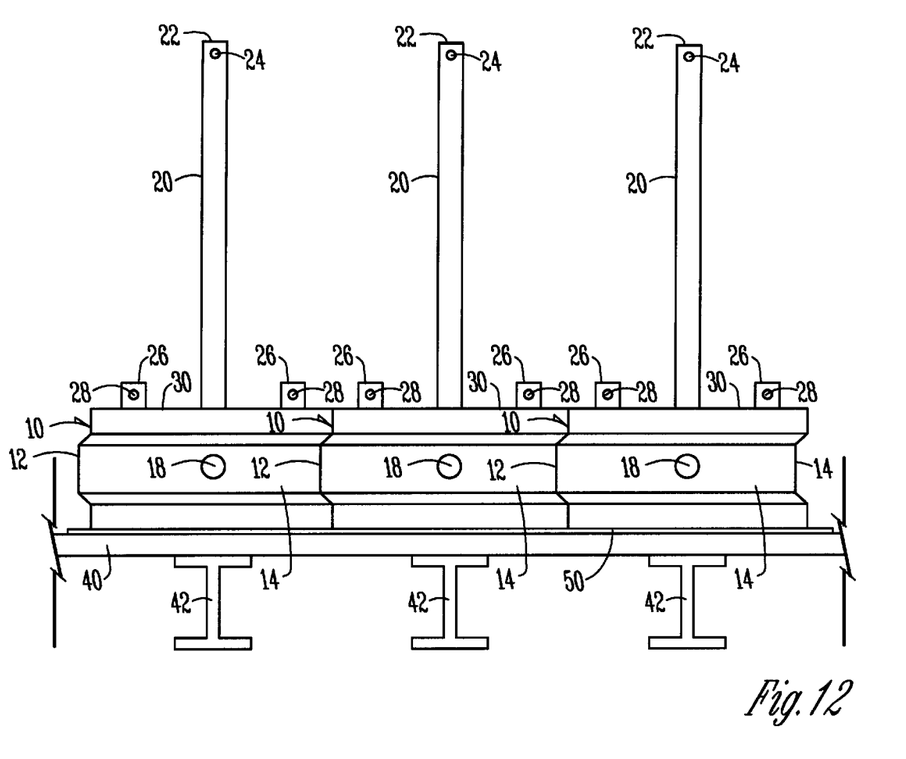
FIG. 12 is an elevational view of an alternate embodiment of the present invention.

FIG. 12 shows an alternate embodiment of the present invention. The embodiment shown in FIG. 12 is substantially the same as that shown in FIG. 6 except for the use of ceramic fiber paper 50 which is laid between the plate 40 and the modules 10. The ceramic fiber paper insulates and cushions the plate 40 and modules 10 as they expand and contract during use. One example of a suitable ceramic fiber paper is known by the trade name Fiberfrax.

In an alternative embodiment of the present invention, the vertical passageways 16 could extend upward, via extended caps 26 or separate tubes, to supply the upper level of the fluidized bed while the vertical tubes 20 could be shorter to supply the lower level of the fluidized bed. In addition, more than two levels could be created by having an additional vertical tube extending from the modules. In this way, there could be two reducing zones or two oxidizing zones, for example.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A gas distribution system for a two-zone fluidized bed reactor comprising:
   an assembly of interlockable grid modules comprised of refractory material for introducing two types of gas at different levels in the fluidized bed;
   wherein each grid module comprises
      a) a body comprising
         a first planar top surface, a second planar bottom surface, at least 3 side surfaces,
      b) at least one essentially horizontal passageway, and
      c) at least one essentially vertical passageway
   a gas manifold comprising a plurality of perimeter modules comprised of refractory material which surround the assembly of grid modules and supplies the grid modules with a first type of gas; and
   a structure for supporting the assembly of grid modules and perimeter modules and for supplying the grid modules with a second type of gas.

2. The system of claim 1 wherein the support structure includes a flat horizontal deck on which the grid modules and perimeter modules rest, the system further comprising:
   openings formed in the deck which match openings formed in the grid modules; and
   a plurality of vertical passageways formed through the grid modules and being in communication with the openings formed in the grid modules enabling gas to be conducted through the support structure and overlying grid modules to the fluidized bed.

3. The system of claim 1 wherein each grid module includes separate passageways formed in the module for conducting and distributing two different types of gas, said passageways including one or more vertical channels passing through the grid module for distributing the second type of gas and a combination of horizontal and vertical passageways for distributing the first type of gas.

4. The system of claim 3 wherein the vertical channels supply the second type of gas to a bottom portion of the fluidized bed and the combination of horizontal and vertical passageways supply the first type of gas to a mid-level portion of the fluidized bed via one or more vertical tubes which extend upwards from the module.

5. The system of claim 4 wherein the vertical tubes are capped, and two or more horizontal holes are formed near the upper end of each tube for introducing gas into the fluidized bed.

6. The system of claim 5 wherein the vertical tubes are capped, and two or more holes which are angled downward 30 to 60 degrees from the horizontal are formed near the upper end of each tube for introducing gas into the fluidized bed.

7. The system of claim 4 wherein the vertical channels which supply gas to the bottom of the fluidized bed are enlarged just below the bed to reduce the velocity of the gas before it enters the fluidized bed.

8. The system of claim 4 wherein the vertical channels which supply gas to the bottom of the fluidized bed are enclosed by perforated caps to prevent backflow of solid particles when the gas flow is stopped.

9. The system of claim 8 wherein at least one horizontal hole is formed in each cap for introducing gas into the fluidized bed.

10. The system of claim 8 wherein the perforated caps are made of either alumina, mullite, silicon carbide, or cermet.

11. The system of claim 4 wherein the vertical tubes which supply gas to the mid-level portion of the fluidized bed are made of either alumina, mullite, silicon carbide, or cermet.

12. The system of claim 3 wherein the vertical channels are connected to vertical tubes that extend upwards to the midlevel portion of the fluidized bed for supplying the second type of gas to the fluidized bed and the combination of horizontal and vertical passageways introduce the first type of gas to a bottom portion of the fluidized bed.

13. The system of claim 3 wherein each grid module includes a body portion having four vertical sides, the body of each grid module being square in plan view and having a substantially rectangular cross section, wherein two of the vertical sides of each module extend outwards to form a tongue and the remaining two vertical sides are recessed to form a groove, wherein the dimensions of the tongue and groove are selected to form a close fitting joint between adjacent grid modules that can be sealed with refractory cement.

14. The system of claim 3 wherein each grid module includes a body portion having three vertical sides, the body of each grid module being triangular in plan view and having a substantially rectangular vertical cross section, wherein the vertical sides of each body are either extended or recessed so that when two or more grid modules are assembled a tongue and groove joint is formed between adjacent grid modules which can be sealed with refractory cement.

15. The system of claim 1 wherein each perimeter module includes horizontal passageways to conduct gas between adjacent perimeter modules and to supply gas to the assembly of grid modules.

16. The system of claim 15 wherein the perimeter modules and the grid modules are formed such that they form tongue and groove joints with each adjacent module.

17. The system of claim 1 wherein the grid modules and perimeter modules are constructed of castable refractory materials.

18. The system of claim 1 wherein the grid modules and perimeter modules are constructed of high-alumina content castable material.

19. A two-zone fluidized bed reactor gas distribution system comprising:
  a supporting surface;
  a first source of gas;
  a second source of gas; and
  a plurality of interlockable grid modules comprised of refractory material supported by the supporting surface, wherein each grid module further comprising
    a body,
    a first passageway extending upward from and being supported by the body, the first passageway being in communication with the first source of gas via essentially horizontal passageways in the body, and
    at least one second passageway formed in the body, the second passageway(s) being in communication with the second source of gas and being disposed lower than the first passageway in the fluidized bed.

20. A method of creating a two-zone fluidized bed reactor gas distribution system comprising the steps of:
  providing a supporting surface;
  providing a plurality of interlockable grid modules comprised of refractory material, each grid module comprising a body, a first passageway extending upward from and being supported by the body, and at least one second passageway formed in the body;
  positioning the plurality of modules together over the supporting surface;
  connecting the first passageway of each module to a source of a first gas via essentially horizontal passageways in the body;
  connecting the second passageway of each module to a source of a second gas;
  introducing the first gas into an upper level of the fluidized bed reactor via the first passageway; and
  introducing the second gas into a lower level of the fluidized bed reactor via the second passageway.

* * * * *